United States Patent
Liu et al.

(10) Patent No.: US 10,353,505 B2
(45) Date of Patent: Jul. 16, 2019

(54) DISPLAY SUBSTRATE, IN-CELL TOUCH SCREEN, DISPLAY APPARATUS, AND TOUCH SCREEN DRIVING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Hailin Xue, Beijing (CN); Haisheng Wang, Beijing (CN); Xiaochuan Chen, Beijing (CN); Xiaoliang Ding, Beijing (CN); Shengji Yang, Beijing (CN); Rui Xu, Beijing (CN); Changfeng Li, Beijing (CN); Wei Liu, Beijing (CN); Pengpeng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/526,984

(22) PCT Filed: May 26, 2016

(86) PCT No.: PCT/CN2016/083441
§ 371 (c)(1),
(2) Date: May 15, 2017

(87) PCT Pub. No.: WO2017/148023
PCT Pub. Date: Sep. 8, 2017

(65) Prior Publication Data
US 2018/0107322 A1    Apr. 19, 2018

(30) Foreign Application Priority Data

Mar. 3, 2016 (CN) .......................... 2016 1 0120948

(51) Int. Cl.
*G06F 3/045* (2006.01)
*G06F 3/041* (2006.01)
(Continued)

(52) U.S. Cl.
CPC .......... *G06F 3/0414* (2013.01); *G02F 1/1343* (2013.01); *G02F 1/13338* (2013.01);
(Continued)

(58) Field of Classification Search
CPC .. G06F 3/0414; G06F 3/0412; G02F 1/13338; G02F 1/1343
(Continued)

(56) References Cited

U.S. PATENT DOCUMENTS

2006/0028095 A1    2/2006  Maruyama et al.
2009/0309616 A1   12/2009  Klinghult et al.
(Continued)

FOREIGN PATENT DOCUMENTS

CN    104407466 A    3/2015
CN    105068695 A   11/2015
(Continued)

OTHER PUBLICATIONS

Text of First Office Action for Chinese Patent Application No. 201610120948.X dated Mar. 22, 2018.
(Continued)

*Primary Examiner* — Jonathan M Blancha
(74) *Attorney, Agent, or Firm* — Calfee, Halter & Griswold LLP

(57) ABSTRACT

An in-cell touch screen includes a pressure sensing structure. The pressure sensing structure includes a plurality of pres-
(Continued)

sure sensitive electrodes arranged in an array and being independent from each other, each pressure sensitive electrode configured for generating a potential difference in response to a pressure caused by pressing; an input electrode electrically connected to the plurality of pressure sensitive electrodes for receiving a fixed potential in a pressure detection phase; and a plurality of output electrodes each electrically connected to a respective one of the plurality of pressure sensitive electrodes for outputting a signal indicative of a change in a potential of the respective pressure sensitive electrode with respect to the fixed potential in the pressure detection phase.

18 Claims, 4 Drawing Sheets

(51) Int. Cl.
  *G02F 1/1333* (2006.01)
  *G02F 1/1343* (2006.01)
  *G06F 3/044* (2006.01)
(52) U.S. Cl.
  CPC ............ *G06F 3/044* (2013.01); *G06F 3/0412* (2013.01); *G06F 3/0416* (2013.01); *G06F 2203/04112* (2013.01)
(58) Field of Classification Search
  USPC ........................................................ 345/174
  See application file for complete search history.

(56) References Cited

U.S. PATENT DOCUMENTS

| | | |
|---|---|---|
| 2010/0156845 A1 | 6/2010 | Kim et al. |
| 2015/0109543 A1 | 4/2015 | Lee |
| 2015/0177880 A1* | 6/2015 | Shin ...................... G06F 3/0412 345/174 |
| 2015/0200235 A1* | 7/2015 | Wang .................. H01L 27/3225 257/40 |
| 2015/0261367 A1* | 9/2015 | Zhang ................... G06F 3/0412 345/173 |
| 2016/0179259 A1* | 6/2016 | Watanabe ............... G06F 3/044 345/174 |
| 2016/0179276 A1* | 6/2016 | Nathan ................. G06F 3/0414 345/174 |
| 2016/0313793 A1* | 10/2016 | Hong ...................... G06F 3/016 |
| 2017/0083142 A1 | 3/2017 | Wang et al. |
| 2017/0242526 A1 | 8/2017 | Cheng |

FOREIGN PATENT DOCUMENTS

| | | |
|---|---|---|
| CN | 105094438 A | 11/2015 |
| CN | 105117089 A | 12/2015 |
| CN | 204965385 U | 1/2016 |
| CN | 204965387 U | 1/2016 |
| CN | 105353923 A | 2/2016 |
| CN | 205068355 U | 3/2016 |

OTHER PUBLICATIONS

International Search Report for Chinese International Application No. PCT/CN2016/083441 dated Nov. 9, 2016.

* cited by examiner

DISPLAY SUBSTRATE, IN-CELL TOUCH SCREEN, DISPLAY APPARATUS, AND TOUCH SCREEN DRIVING METHOD

CROSS-REFERENCE TO RELATED APPLICATIONS

The present application is the U.S. national phase entry of PCT/CN2016/083441, with an international filing date of May 26, 2016, which claims the benefit of Chinese Patent Application No. 201610120948.X, filed on Mar. 3, 2016, the entire disclosures of which are incorporated herein by reference.

TECHNICAL FIELD

The present disclosure relates to the field of touch control technologies, and particularly to a display substrate, an in-cell touch screen, a display apparatus and a touch screen driving method.

BACKGROUND

Pressure sensing techniques have been applied in fields such as industry control and medical care. Currently, when applied in a display apparatus, pressure sensing is usually achieved by adding additional mechanisms in the backlight part or the bezel part of a display panel. Such a design requires a significant modification of the outline structure of the display apparatus. Moreover, this design is limited in terms of accuracy due to a relatively large assembly error.

SUMMARY

Embodiments of the present disclosure provide a display substrate in which a pressure sensing structure is integrated. Also provided is an in-cell touch screen, a display apparatus and a method of driving the in-cell touch screen.

According to an aspect of the present disclosure, a display substrate is provided comprising a substrate body and a pressure sensing structure formed on the substrate body. The pressure sensing structure comprises a plurality of pressure sensitive electrodes arranged in an array and being independent from each other. Each of the pressure sensitive electrodes is configured for generating a potential difference in response to a pressure caused by pressing. The pressure sensing structure further comprises an input electrode electrically connected to the plurality of pressure sensitive electrodes for receiving a fixed potential in a pressure detection phase. The pressure sensing structure further comprises a plurality of output electrodes each electrically connected to a respective one of the plurality of pressure sensitive electrodes for outputting a signal indicative of a change in a potential of the respective pressure sensitive electrode with respect to the fixed potential in the pressure detection phase.

In some embodiments, the input electrode, the plurality of pressure sensitive electrodes and the plurality of output electrodes are stacked on top of each other, the plurality of pressure sensitive electrodes arranged between the input electrode and the plurality of output electrodes.

In some embodiments, the display substrate further comprises sub-pixels arranged in an array on the substrate body, and the plurality of pressure sensitive electrodes and the plurality of output electrodes are patterned within gaps between the sub-pixels.

In some embodiments, each of the pressure sensitive electrodes and each of the output electrodes have a grid pattern.

In some embodiments, the grid pattern of the output electrode has a line width not smaller than that of the grid pattern of the pressure sensitive electrode.

In some embodiments, the input electrode is pattern within the gaps between the sub-pixels such that the input electrode has a grid pattern.

In some embodiments, the input electrode is made of the same material as pixel electrodes of the sub-pixels and disposed in the same layer as the pixel electrodes.

In some embodiments, the display substrate further comprises data lines and gate lines electrically connected to respective ones of the sub-pixels, and the plurality of output electrodes are made of metal and disposed in the same layer as the data lines or the gate lines.

In some embodiments, the display substrate further comprises a common electrode formed above the pixel electrodes, and the plurality of output electrodes are made of the same material as the common electrode and disposed in the same layer as the common electrode.

In some embodiments, the plurality of pressure sensitive electrodes are made of a piezoelectric material.

In some embodiments, the display substrate is an array substrate or opposite substrate for a liquid crystal display.

In some embodiments, the display substrate is an array substrate or protective coverplate for an electroluminescent display.

According to another aspect of the present disclosure, an in-cell touch screen is provided comprising: the display substrate as described above; an opposite substrate opposite to the display substrate; touch electrodes disposed at the display substrate or the opposite substrate for support of touch detection; and a controller connected to the display substrate and configured to apply the fixed potential to the input electrode in the pressure detection phase and to determine a pressed position and a magnitude of the pressure based on the signals output from the plurality of output electrodes.

In some embodiments, the controller is further configured to apply touch detecting signals to the touch electrodes and determine a touch position based on a signal indicative of a change in capacitance of the touch electrodes in a touch detection phase different from the pressure detection phase.

In some embodiments, the in-cell touch screen further comprises sub-pixels disposed at the display substrate or the opposite substrate, and gate lines and data lines electrically connected to respective ones of the sub-pixels. The controller is further configured to: apply the touch detecting signals to the gate lines and the data lines in the touch detection phase and the pressure detection phase; and apply the touch detecting signals to the touch electrodes in the pressure detection phase.

In some embodiments, the controller is further configured to perform, in the touch detection phase, an operation selected from the group consisting of: not applying any signal to the input electrode to render it floated, and applying the touch detecting signals to the input electrode.

In some embodiments, the controller is further configured to apply the touch detecting signals to the touch electrodes and determine a touch position based on a signal indicative of a change in capacitance of the touch electrodes in the pressure detection phase.

In some embodiments, the in-cell touch screen further comprises sub-pixels disposed at the display substrate or the opposite substrate, and gate lines and date lines electrically connected to respective ones of the sub-pixels. The controller is further configured to apply the touch detecting signals to the gate lines and the data lines in the pressure detection phase.

These and other aspects of the present disclosure will be apparent from and elucidated with reference to the embodiment(s) described hereinafter.

BRIEF DESCRIPTION OF THE DRAWINGS

More details, features and advantages of the present disclosure are disclosed in the description of exemplary embodiments in connection with the accompanying drawings, in which.

DETAILED DESCRIPTION

Figure 1A:
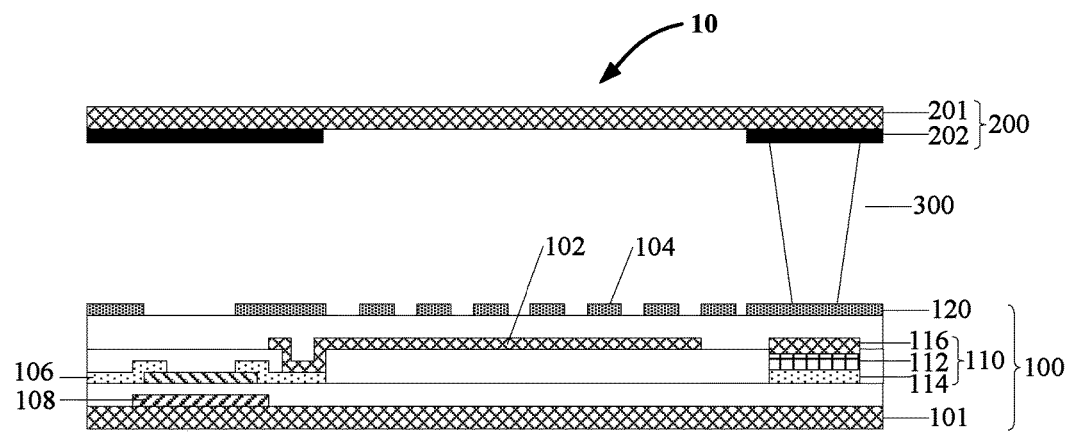
FIG. 1A is a schematic cross-sectional view of an in-cell touch screen according to an embodiment of the present disclosure.

The disclosure will now be described more fully hereinafter with reference to the accompanying drawings, in which exemplary embodiments of the disclosure are shown. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1A is a schematic cross-sectional view of an in-cell touch screen 10 according to an embodiment of the present disclosure. As shown in FIG. 1A, the in-cell touch screen 10 includes a display substrate 100, an opposite substrate 200 and spacers 300 (only one of them is shown) spanning the display substrate 100 and the opposite substrate 200.

The display substrate 100 comprises a substrate body 101 and a pressure sensing structure 110 formed on the substrate body 101. The pressure sensing structure 110 comprises a plurality of pressure sensitive electrodes 112 (only one of them is shown) that are arranged in an array on the substrate body 101 and are independent from each other. Each pressure sensitive electrode 112 is used to generate a potential difference in response to a pressure caused by pressing. In some embodiments, the pressure sensitive electrodes 112 may be made of a piezoelectric material such as ZnO, ZnS or AlN.

In the example of FIG. 1A, when the opposite substrate 200 is pressed, the pressure applied to the pressed position will be delivered to a corresponding pressure sensitive electrode 112 through e.g. the spacers 300, which then generates a potential difference in response to the pressure.

The pressed position and a magnitude of the pressure may be determined by detection of the potential difference generated by the pressure sensitive electrodes 112. To this end, the pressure sensing structure 110 further comprises an input electrode 116 which is electrically connected to the plurality of pressure sensitive electrodes 112 for receiving a fixed potential in a pressure detection phase. The pressure sensing structure 110 further comprises a plurality of output electrodes 114 (only one of them is shown in FIG. 1A). Each output electrode 114 is electrically connected to a respective one of the plurality of pressure sensitive electrodes 112 for outputting a signal indicative of a change in a potential of the respective pressure sensitive electrode with respect to the fixed potential in the pressure detection phase. The pressed position may be determined by determining from which of the plurality of output electrodes 114 the changed potential signal is stemmed, and the magnitude of the pressure may be determined from an amount of the change in the potential.

Figure 1B:
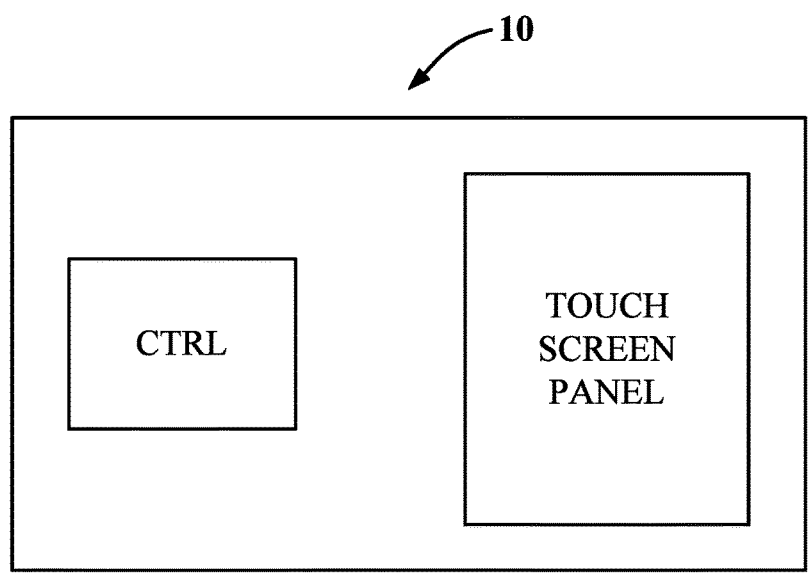
FIG. 1B is a schematic block diagram of the in-cell touch screen of FIG. 1A.

FIG. 1B is a schematic block diagram of the in-cell touch screen 10 of FIG. 1A. As shown in this figure, the in-cell touch screen 10 further comprises a controller CTRL which is connected to the display substrate 100 shown in FIG. 1A. The controller CTRL is configured to apply the fixed potential to the input electrode 116 in the pressure detection phase, and to determine the pressed position and the magnitude of the pressure based on the signals output from the plurality of output electrodes 114.

The controller CTRL may be implemented with a general purpose processor, a digital signal processor (DSP), an application specific integrated circuit (ASIC), a field programmable gate array (FPGA) or other programmable logic device, discrete gate or transistor logic, discrete hardware components or any combination thereof that is designed to perform the functionality described herein.

Referring back to FIG. 1A, the display substrate 100 is shown as an array substrate of a liquid crystal display where sub-pixels are arranged in an array. As is known, each sub-pixel comprises a pixel electrode 102 and an associated thin film transistor. A data line 106 connected to a source of the thin film transistor and a gate line 108 formed as a gate of the thin film transistor are shown in FIG. 1A. The display substrate 100 further comprises a common electrode 104 formed above the pixel electrode 102. To achieve a touch detection function, the in-cell touch screen 10 further comprises touch electrodes 120 for support of touch detection. The touch electrodes 120 may be based on any known techniques in the art. In the example of FIG. 1A, the touch electrodes 120 comprise a plurality of self-capacitance electrodes that are arranged in the same layer and independent from each other. Specifically, the common electrode 104 may be divided into blocks each reused as a self-capacitance electrode.

Although some details of the in-cell touch screen 10 are shown in FIG. 1A, other embodiments are possible. For example, the touch electrodes 120 may be disposed on a side of the opposite substrate 200 that faces the display substrate 100. In addition, the touch electrodes 120 may also be based on mutual-capacitance touch sensors which are comprised of touch driving electrodes and touch sensing electrodes intersecting with each other. For another example, the pressure sensing structure 110 may be disposed on a side of the opposite substrate 200 that faces the display substrate 100. It will be further understood that the display substrate 100 per se may be an array substrate or a substrate opposite to the array substrate in a liquid crystal display. In some embodiments, the display substrate 100 may also be an array substrate or a coverplate opposite to the array substrate in an electroluminescent display.

More details of the in-cell touch screen 10 are described below with reference to FIGS. 1A, 1B, 2 and 3.

As shown in FIG. 1A, the opposite substrate 200 comprises a substrate body 201 and a black matrix 202. The pressure sensing structure 110 may be formed within a region on the display substrate 100 where the projection of the black matrix 202 is located, and thus is blocked by the black matrix 202. Specifically, the pressure sensing structure 110 may be formed within gaps between the sub-pixels. This way, the aperture ratio of the display area would not be affected by the pressure sensing structure 110.

Further, in the pressure sensing structure 110, the input electrode 116, the pressure sensitive electrodes 112 and the output electrodes 114 may be stacked on top of each other, with the pressure sensitive electrodes 112 disposed between the input electrode 116 and the output electrodes 114. This way, the pressure sensing structure 110 occupies a relatively small area of the display substrate 100.

Figure 2:
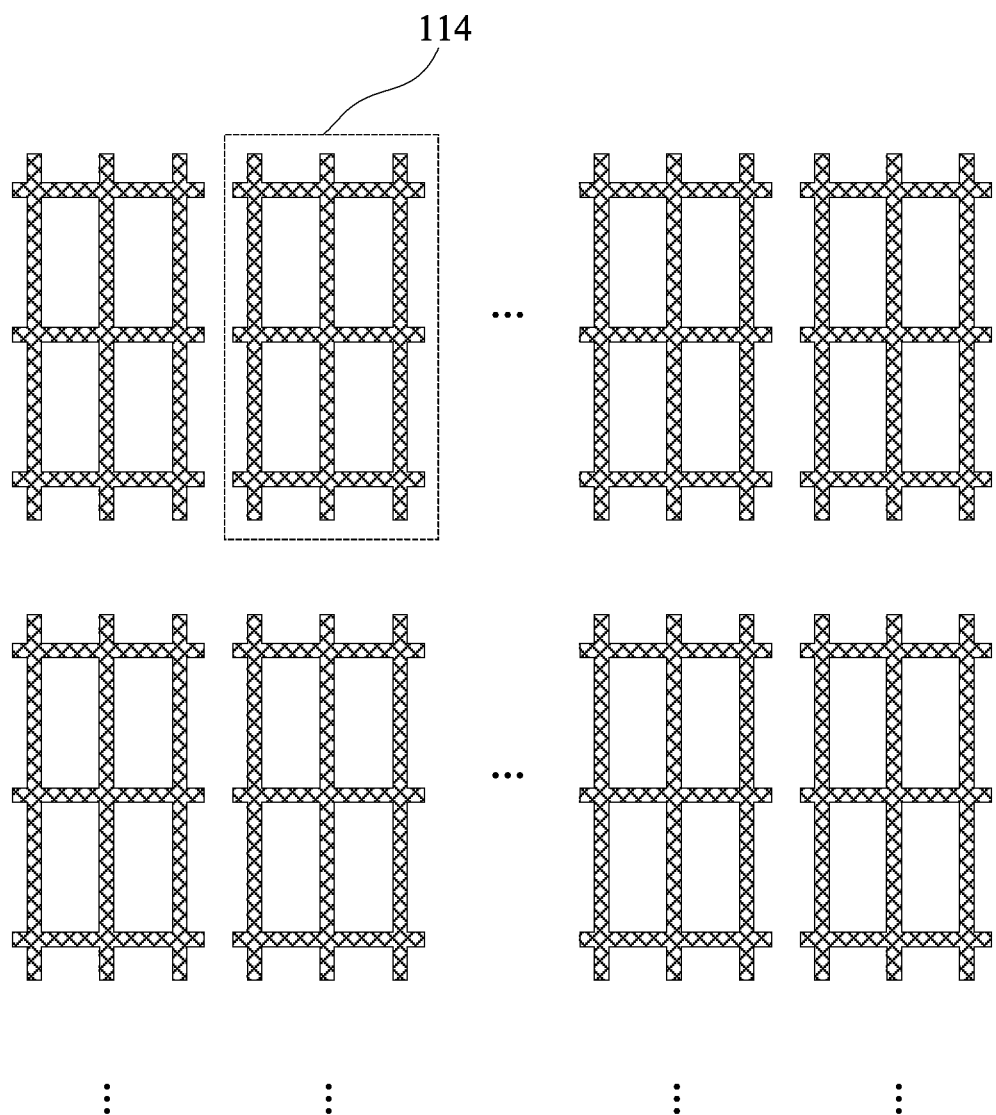
FIG. 2 is a schematic plan view of an arrangement of the output electrodes in an in-cell touch screen according to an embodiment of the present disclosure.

FIG. 2 is a schematic plan view of an arrangement of the output electrodes 114 in the in-cell touch screen 10 according to an embodiment of the present disclosure. The dashed block of FIG. 2 indicates one output electrode 114. The individual output electrodes 114 are arranged in an array, and are independent from each other, namely, insulated from each other. In the example as shown, each output electrode 114 has a grid pattern which comprises lateral slits and longitudinal slits. In other embodiments, the output electrode 114 may have only lateral slits or it may have only longitudinal slits. Furthermore, the individual output electrodes 114 may be electronically connected to the controller CTRL through respective wirings (not shown).

The pressure sensitive electrodes 112 are stacked with the output electrodes 114, and thus are not shown in FIG. 2. The pressure sensitive electrodes 112 have the same pattern as the output electrodes 114, such as a grid pattern. In some embodiments, the grid pattern of the output electrode 114 has a line width not smaller than that of the pressure sensitive electrode 112. This facilitates transmission of the signal indicative of a change in the potential of the pressure sensitive electrode 112 through the output electrode 114.

Figure 3:
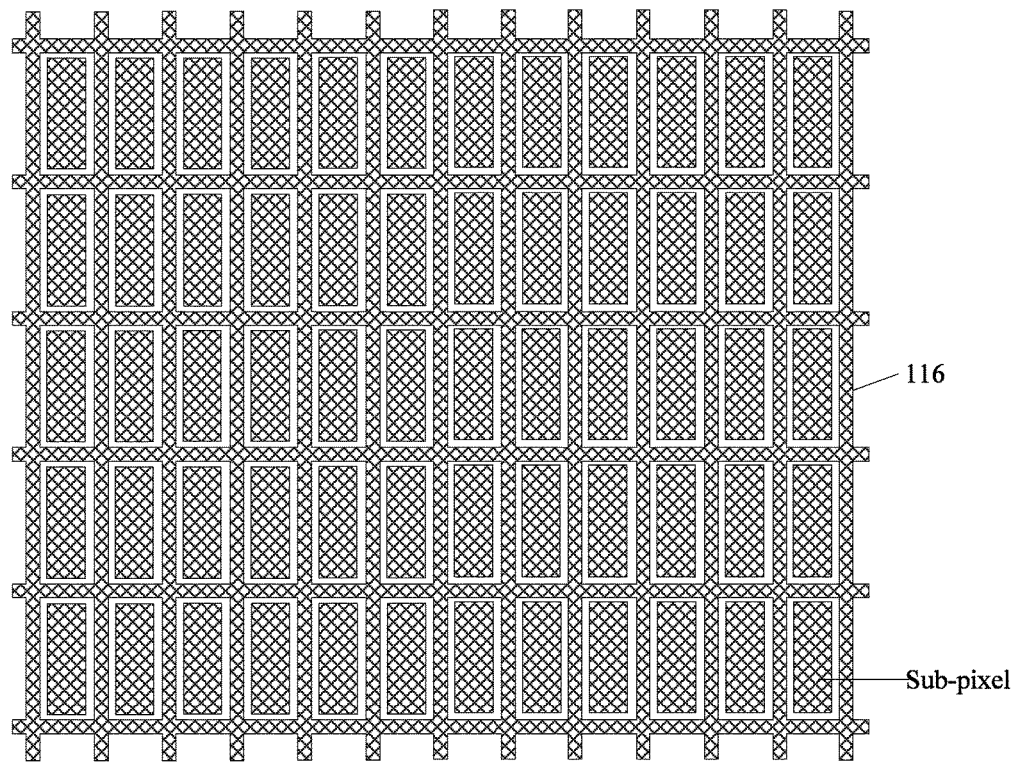
FIG. 3 is a schematic plan view of an arrangement of the input electrode in an in-cell touch screen according to an embodiment of the present disclosure.

FIG. 3 is a schematic plan view of an arrangement of the input electrode 116 in the in-cell touch screen 10 according to an embodiment of the present disclosure. As shown in FIG. 3, the input electrode 116 is also patterned within the gaps between the sub-pixels such that the input electrode 116 has a grid pattern. Specifically, the input electrode 116 may be one single grid that is distributed throughout the entire display area. This way, the input electrode 116 may have a large coverage and provide a stable reference potential to all the pressure sensitive electrodes 112.

Although some details of the in-cell touch screen 10 have been described above, other embodiments are possible. For example, the black matrix 202 may also be disposed on a side of the display substrate 100 that faces the opposite substrate 200. For another example, the output electrodes 114 may be disposed on top of the pressure sensitive electrodes 112, and the input electrode 116 may be disposed under the pressure sensitive electrodes 112.

In some embodiments, the input electrode 116 is made of the same material as the pixel electrodes 102 of the sub-pixels, and is disposed in the same layer as the pixel electrodes 102. In this case, the input electrode 116 is made of transparent conductive oxide such indium tin oxide (ITO). Specifically, a one-time-patterning process may be utilized to fabricate the pixel electrodes 102 and the input electrode 116 simultaneously. This way, no additional process is needed. In addition, the output electrodes 114 may be made of metal and disposed in the same layer as the gate line 108 or the data line 106. Specifically, the output electrodes 114 may be fabricated using a one-time-patterning process while the gate line 108 or data line 106 is being fabricated. This way, no additional process is needed.

In some embodiments, the output electrodes 114 may also be made of the same material as the common electrode 104 (e.g., transparent conductive oxide such as ITO), and disposed in the same layer as the common electrode 104. Specifically, a one-time-patterning process may be utilized to fabricate the common electrode 104 and the output electrodes 114 simultaneously. This way, no additional process is needed.

Figure 4:
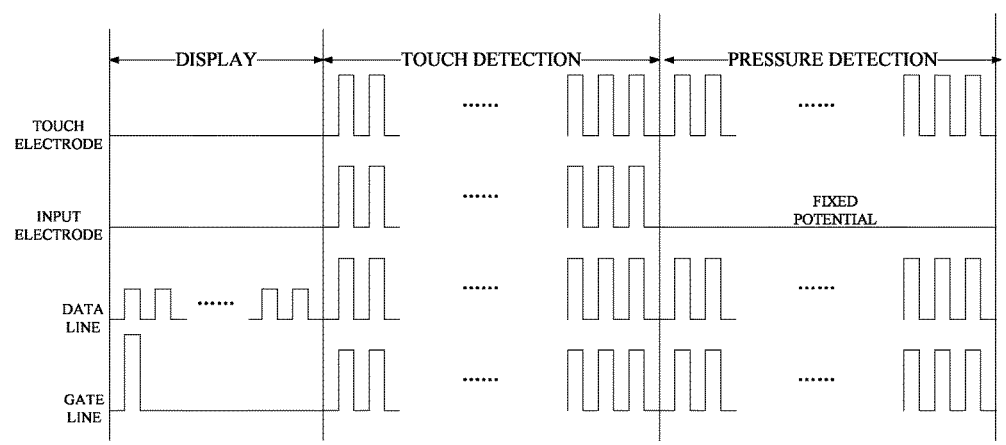
FIG. 4 is a schematic timing diagram of a method of driving an in-cell touch screen according to an embodiment of the present disclosure.

FIG. 4 is a schematic timing diagram of a method of driving the in-cell touch screen 10 according to an embodiment of the present disclosure. As shown in the figure, each frame period of the touch screen 10 is divided into a display phase, a touch detection phase and a pressure detection phase.

In the display phase, gate scan signals are successively applied to the gate lines 108, grayscale signals are applied to respective data lines 106, and a common electrode signal is applied to the touch electrodes 120 that are reused as the common electrode 104. Thereby, the display function is achieved.

In the touch detection phase, the controller CTRL applies touch detecting signals to the touch electrodes 120 and determines a touch position based on a signal indicative of a change in capacitance of the touch electrodes. Thereby, the touch function is achieved.

In the pressure detection phase, the controller CTRL applies a fixed potential to the input electrode 116 and determines a pressed position and a magnitude of the pressure based on the signals output from the plurality of output electrodes 114. Thereby, the pressure detection function is achieved.

In some embodiments, as shown in FIG. 4, the touch detecting signals may be applied to the gate lines 108 and the data lines 106 in the touch detection phase and the pressure detection phase to avoid an influence of capacitance-to-ground of the gate lines 108 and the data lines 106 on the accuracy of the touch detection and pressure detection.

Moreover, the touch detecting signals may also be applied by the controller CTRL to the input electrode 116 in the touch detection phase to avoid capacitance-to-ground of the input electrode 116 on the accuracy of the touch detection. The influence of the capacitance-to-ground of the gate lines 108, the data lines 106 and the input electrode 116 on the detection results may be prevented by varying their potentials synchronously. Alternatively, the controller CTRL may apply no signals to the input electrode 116 to render it floated in the touch detection phase.

In addition, the controller CTRL may keep applying the touch detecting signals to the touch electrodes 120 in the pressure detection phase to avoid capacitance-to-ground of the touch electrodes 120 on the accuracy of the pressure detection.

Embodiments have been described above where displaying, touch detection and pressure detection are performed in a time divisional manner. In a non-limiting embodiment, the display driving circuit and the controller CTRL may be integrated into one chip that enables the display driving, touch detection and pressure detection.

Figure 5:
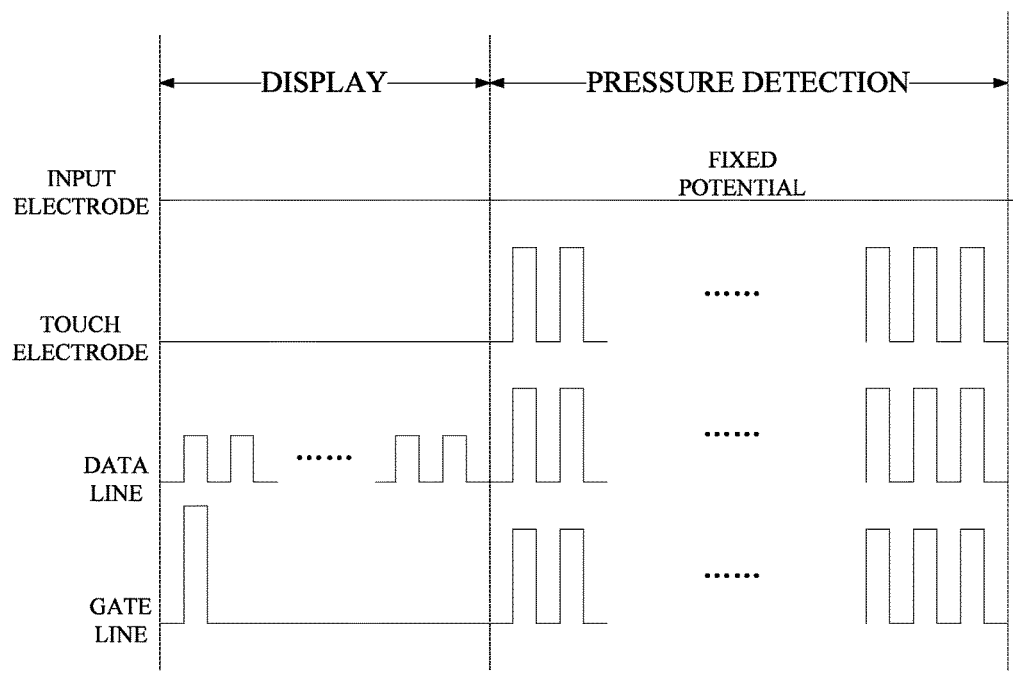
FIG. 5 is another schematic timing diagram of a method of driving an in-cell touch screen according to an embodiment of the present disclosure.

FIG. 5 is another schematic timing diagram of a method of driving the in-cell touch screen 10 according to an embodiment of the present disclosure. As shown in the figure, each frame period of the touch screen 10 is divided into a display phase and a pressure detection phase that are performed concurrently.

Specifically, in the pressure detection phase, the controller CTRL applies a fixed potential to the input electrode 116, and determines a pressed position and a magnitude of the pressure based on signals output from the plurality of output electrodes 114. Simultaneously, the controller CTRL also applies the touch detecting signals to the touch electrodes 120 and determines a touch position based on a signal indicative of a change in the capacitance of the touch electrodes 120.

As described in the above embodiments, the touch detecting signals may be applied to the gate lines 108 and the data lines 106 in the pressure detection phase to avoid the influence of the capacitance-to-ground of the gate lines 108 and data lines 106 on the accuracy of the touch detection and pressure detection.

Although the in-cell touch screen is illustrated and described as a liquid crystal display panel in the above embodiments, it will be understood that it may also be based on an organic electroluminescent display panel or other types of display panels.

The in-cell touch screen as described above may form a part of a display apparatus. The display apparatus may be any product or component having display functionality, such as a cell phone, a tablet, a television, a monitor, a laptop, a digital photo-frame or a navigator.

According to the embodiments of the present disclosure, the pressure sensing structure is integrated into the touch screen, such that no significant modification of the outline structure of the display apparatus is needed. Moreover, the integrated pressure sensing structure is less limited by the assembly error, leading to improved detection accuracy.

Various modifications and variations to the disclosure may be made by those skilled in the art without departing from the spirit and scope of the disclosure. Thus, if these modifications and variations fall within the scope of the appended claims and equivalents thereof, such modifications and variations are intended to be encompassed by the present disclosure.

What is claimed is:
1. A display substrate comprising:
a substrate body;
sub-pixels arranged in an array on the substrate body; and
a pressure sensing structure formed on the substrate body,
wherein the pressure sensing structure comprises
a plurality of pressure sensitive electrodes arranged in an array and being independent from each other, each of the pressure sensitive electrodes configured for generating a potential difference in response to a pressure caused by pressing;

an input electrode electrically connected to the plurality of pressure sensitive electrodes for receiving a fixed potential in a pressure detection phase; and
a plurality of output electrodes each electrically connected to a respective one of the plurality of pressure sensitive electrodes for outputting a signal indicative of a change in a potential of the respective pressure sensitive electrode with respect to the fixed potential in the pressure detection phase,
wherein the input electrode is pattern within gaps between the sub-pixels such that the input electrode has a grid pattern, and
wherein the input electrode is made of a same material as pixel electrodes of the sub-pixels and disposed in a same layer as the pixel electrodes.

2. The display substrate of claim 1, wherein the input electrode, the plurality of pressure sensitive electrodes and the plurality of output electrodes are stacked on top of each other, the plurality of pressure sensitive electrodes arranged between the input electrode and the plurality of output electrodes.

3. The display substrate of claim 2, wherein the plurality of pressure sensitive electrodes and the plurality of output electrodes are patterned within the gaps between the sub-pixels.

4. The display substrate of claim 3, wherein each of the pressure sensitive electrodes and each of the output electrodes are arranged in the grid pattern.

5. The display substrate of claim 4, wherein the grid pattern of the output electrode has a line width not smaller than that of the grid pattern of the pressure sensitive electrode.

6. The display substrate of claim 1, further comprising data lines and gate lines electrically connected to respective ones of the sub-pixels, wherein the plurality of output electrodes are made of metal and disposed in a same layer as the data lines or the gate lines.

7. The display substrate of claim 1, further comprising a common electrode formed above the pixel electrodes, wherein the plurality of output electrodes are made of a same material as the common electrode and disposed in a same layer as the common electrode.

8. The display substrate of claim 1, wherein the plurality of pressure sensitive electrodes are made of a piezoelectric material.

9. The display substrate of claim 1, wherein the display substrate is an array substrate or opposite substrate for a liquid crystal display.

10. The display substrate of claim 1, wherein the display substrate is an array substrate or protective coverplate for an electroluminescent display.

11. An in-cell touch screen comprising:
the display substrate as recited in claim 1;
an opposite substrate opposite to the display substrate;
touch electrodes disposed at the display substrate or the opposite substrate for support of touch detection; and
a controller connected to the display substrate and configured to apply the fixed potential to the input electrode in the pressure detection phase and to determine a pressed position and a magnitude of the pressure based on the signals output from the plurality of output electrodes.

12. The in-cell touch screen of claim 11, wherein the controller is further configured to apply touch detecting signals to the touch electrodes and determine a touch position based on a signal indicative of a change in capacitance of the touch electrodes in a touch detection phase different from the pressure detection phase.

13. The in-cell touch screen of claim 12, further comprising gate lines and data lines electrically connected to respective ones of the sub-pixels, wherein the controller is further configured to:
apply the touch detecting signals to the gate lines and the data lines in the touch detection phase and the pressure detection phase; and
apply the touch detecting signals to the touch electrodes in the pressure detection phase.

14. The in-cell touch screen of claim 13, wherein the controller is further configured to perform, in the touch detection phase, an operation selected from a group consisting of:
not applying any signal to the input electrode to render it floated, and applying the touch detecting signals to the input electrode.

15. The in-cell touch screen of claim 11, wherein the controller is further configured to apply the touch detecting signals to the touch electrodes and determine a touch position based on a signal indicative of a change in capacitance of the touch electrodes in the pressure detection phase.

16. The in-cell touch screen of claim 15, further comprising gate lines and date lines electrically connected to respective ones of the sub-pixels, wherein the controller is further configured to apply the touch detecting signals to the gate lines and the data lines in the pressure detection phase.

17. A display apparatus comprising the in-cell touch screen as recited in claim 11.

18. A method of driving the in-cell touch screen of claim 11, comprising:
applying touch detecting signals to the touch electrodes and determining a touch position based on a signal indicative of a change in capacitance of the touch electrodes in a touch detection phase; and
applying the fixed potential to the input electrode and determining a pressed position and a magnitude of the pressure based on the signals output from the plurality of output electrodes in a pressure detection phase.

* * * * *